United States Patent [19]

Covey, Jr.

[11] 4,368,163
[45] Jan. 11, 1983

[54] APPARATUS FOR VAPORIZING FUEL FOR ENGINE IN CONJUNCTION WITH CARBURETOR

[76] Inventor: Ray M. Covey, Jr., 9700 Trinidad, El Paso, Tex. 79925

[21] Appl. No.: 279,619

[22] Filed: Jul. 1, 1981

[51] Int. Cl.³ .............................................. F02M 31/14
[52] U.S. Cl. ................................. 261/39 R; 123/546; 123/578; 261/142; 261/144; 261/145; 261/DIG. 83
[58] Field of Search .............................. 123/578, 546; 261/DIG. 83, 144, 145, 142, 39 R

[56] References Cited

U.S. PATENT DOCUMENTS

| 1,304,888 | 5/1919 | Kenneweg | 123/578 |
| 1,630,048 | 5/1927 | Balachowsky et al. | 123/546 |
| 1,997,497 | 4/1935 | Pogue | 261/36 A |
| 2,185,573 | 1/1940 | Spindler | 123/578 |
| 2,221,352 | 11/1940 | Lauder | 123/546 |
| 2,733,698 | 2/1956 | Voigt | 123/578 |
| 3,963,013 | 6/1976 | Authement et al. | 123/578 |

Primary Examiner—Tim R. Miles
Attorney, Agent, or Firm—Paul H. Gallagher

[57] ABSTRACT

A vaporizer chamber includes a coil therein, the coil having extensions extending into the exhaust pipe of the engine, the exhaust gases passing through the coil and heating the interior of the chamber. Fuel is delivered to the vaporizer chamber, and vaporized there when the exhaust gases are heated. A thermostat unit is mounted on the exhaust pipe, and when heated, shifts a valve to direct the fuel to the vaporizer chamber, instead of to the carburetor. This shifting is gradual. A throttle controls the flow of vaporized fuel to the outlet of the carburetor. The usual accelerator pedal is operative for controlling the throttle for the vaporized fuel in unison with the usual throttle provided in the carburetor. When starting the engine cold, it is fed atomized fuel from the carburetor, and when the engine warms up, the fuel to the carburetor is reduced, and that to the vaporizer chamber is increased, until only vaporized fuel is so fed, and in each case the delivery of fuel to the engine is controlled by the corresponding throttle in response to actuation of the same accelerator pedal.

7 Claims, 6 Drawing Figures

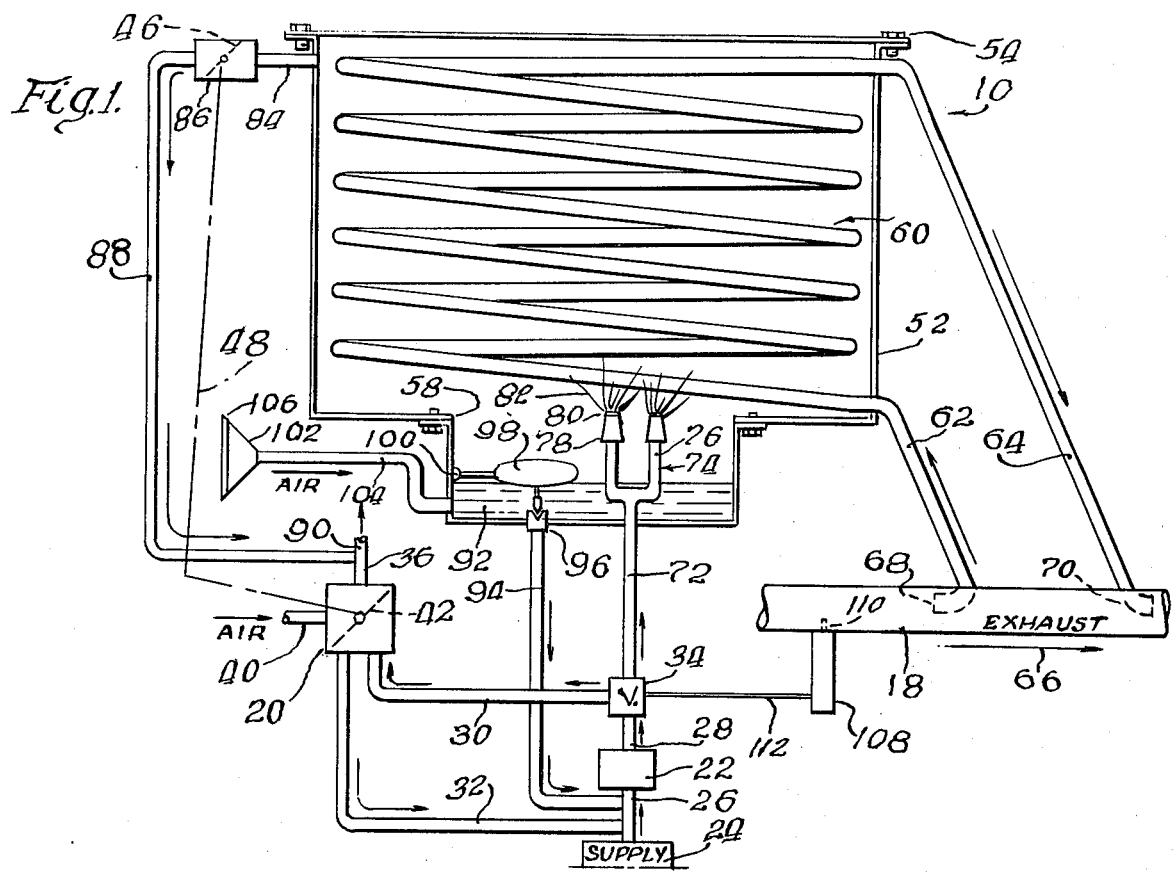
Fig.1.
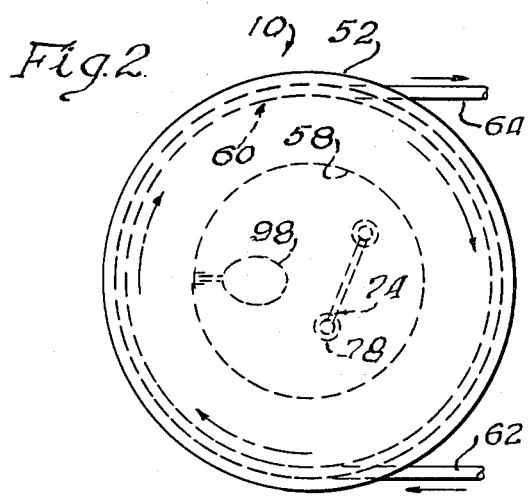
Fig.2.
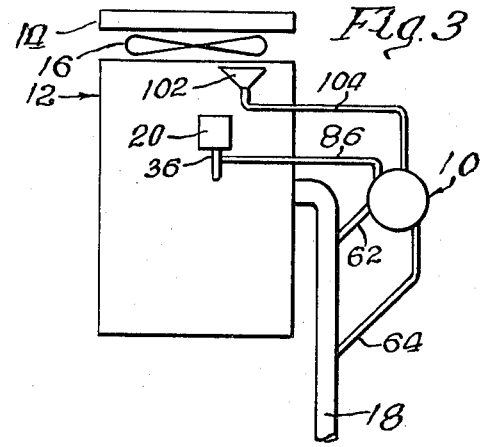
Fig.3.
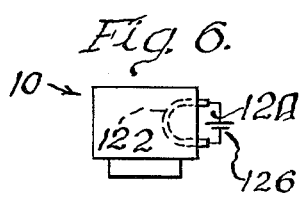
Fig.6.
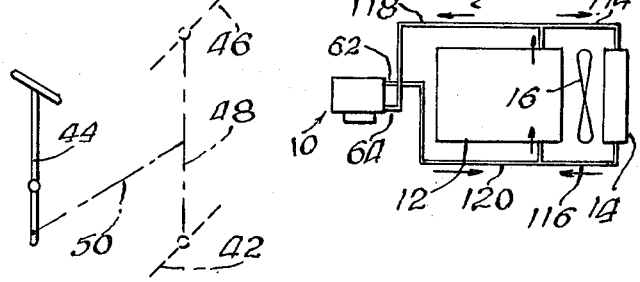
Fig.4.
Fig.5.

APPARATUS FOR VAPORIZING FUEL FOR ENGINE IN CONJUNCTION WITH CARBURETOR

FIELD OF THE INVENTION

The invention resides in the field of supplying fuel to a gasolene engine, the most common example of which is the case of the automobile. The invention further resides in the field of reducing the amount of fuel required for given power, and hence obtaining more miles per gallon.

OBJECTS OF THE INVENTION

A main and broad object of the invention is to provide a device and method for reducing the amount of fuel required for a gasolene engine for a predetermined amount of power.

Another broad object is to provide a device and method of the foregoing character which utilizes vaporized, as distinguished from liquid, fuel, but such used in conjunction with the usual atomized liquid fuel.

A still further object is to provide a device and method of the foregoing character having the following features and advantages:

1. It can be applied to an automobile engine virtually without altering the engine, and particularly without interfering with the carburetor incorporated as a standard accessory to an engine, except that when the engine is warmed up, the device of the present invention renders the carburetor ineffective, and supplies vapor to the engine.
2. The fuel is vaporized by the heat from the exhaust gases from the engine.
3. The feed of the vaporized fuel to the engine is controlled by the same mechanism, such as the accelerator pedal, that normally controls the standard carburetor, and with the further refinement that such accelerator pedal control is continuous through the transition from feed of atomized fuel to the feed of vaporized fuel to the engine.
4. It includes means for developing pressure by the radiator cooling air for assisting in controlling the feed of fuel vapor to the engine.
5. It includes a novel arrangement for pumping liquid fuel by the usual fuel pump, provided in an automobile, to a vaporized chamber, and for return of excess liquid fuel from the vaporizer chamber to the fuel pump.
6. The device is extremely simple, in materials required for making it, in fabrication of it, and in its functioning.

DESCRIPTION OF A PREFERRED EMBODIMENT

In the drawings:

FIG. 1 is a semi-diagrammatic view, showing the vaporizer chamber of the invention, in section, and other components in diagrammatic form;

FIG. 2 is a top view of the vaporizer chamber in FIG. 1;

FIG. 3 is a semi-diagrammatic view of an engine, and elements of the invention applied thereto;

FIG. 4 is a diagram of throttle means of the standard carburetor, and the throttle means of the present invention, actuated in unison by an accelerator pedal;

FIG. 5 is a diagram of a modified form wherein the fuel is vaporized by the coolant instead of the exhaust gases; and FIG. 6 is a diagram of another modified form wherein the fuel is vaporized by an electric heater.

The invention will find ready adaptability to automobiles, but it is not limited thereto and can be applied to any internal combustion engine. Moreover, the device will be found most applicable, at least from a practical standpoint, to the use of gasolene as a fuel, but it is also applicable to other fuels. For convenience, in the present instance, the invention will be shown as applied to an automobile, with the above understanding as to the scope thereof.

Referring in detail to the drawings, a vaporizer chamber 10 is shown in large scale, in section as applied to an automobile engine. The engine is shown diagrammatically at 12 in FIG. 3, and includes a cooling radiator 14, and a cooling fan 16, the radiator and fan being standard items, the fan producing a stream of air, in its cooling operation, which is utilized for a specific purpose, as will be referred to again hereinbelow.

The engine includes a usual exhaust pipe 18, a carburetor 20 and a fuel pump 22. A fuel supply is indicated at 24. All of the foregoing elements or components are standard, and in the usual operation, the fuel pump 22 draws liquid fuel (gasolene) from the supply 24 through a fuel line 26 leading to the inlet of the fuel pump, and then through a fuel line 28 leading from the outlet of the pump. In the standard operation of the engine, the fuel continues through a fuel line 30 to the carburetor 20. Excess fuel, not utilized through the carburetor, returns through a first return line 32 to the inlet of the fuel pump, communicating with the supply 24. In the present instance a control valve 34 is provided in accordance with the principles of the present invention, and is interposed between the fuel lines 28, 30. The carburetor 20 has an outlet line 36 carrying atomized fuel to the engine, as indicated also in FIG. 3.

The carburetor 20, a standard and known component, has an air inlet line 40 through which air from atmosphere is carried thereto as controlled by a throttle 42, here identified a first throttle for mixture with the atomized gasolene for forming the combustible mixture required. The throttle 42 is controlled in the usual fashion, by means of an accelerator pedal 44 (FIG. 4) as will be referred to in again hereinbelow. The device of the invention includes another throttle 46, referred to for convenience as the second throttle, for controlling the vaporized fuel. The two throttles are interconnected by a link 48, which is directly actuated by the accelerator pedal 44 through a mechanism indicated diagrammatically at 50. The throttles 42, 46 are actuated in unison, by the accelerator pedal, and both in the same sense, that is, both opened or both closed.

The vaporizer chamber 10 includes a housing or tank 52 closed to the exterior except with respect to certain elements, as referred to again. The housing includes a cover 54, and it includes a bottom element 55, forming a well or pit 56, secured to the housing and surrounding an opening 58 in the bottom of the housing.

A tubing coil 60 is positioned in the chamber and has terminal extensions 62, 64 leading through to the exterior of the chamber, and extending into the exhaust pipe 18. The exhaust gases flow through the exhaust pipe as indicated by the arrow 66, and the first terminal extension 62 has a forwardly turned end element 68, forming a scoop for receiving a portion of the exhaust gases which are then forced into and through the coil 60 and then out through the other extension 64 where they are emitted through an end element 70 in the exhaust pipe.

Thus a portion of the exhaust gases continuously flow through the coil 60 heating the vaporizer chamber.

Leading from the valve 34 (FIG. 1) referred to above, is another outlet fuel line 72, carrying fuel therethrough as determined by the setting of the valve 34. The line 72 continues to a "T" fitting 74 having arms 76 and each provided with a nozzle or jet 78, extending into the interior of the vaporizer chamber. Preferably the outlet ends of the nozzles are provided with a fine screen 80, of in the neighborhood of 100 mesh size. The mesh forms a spray or mist, indicated at 82, of the fuel, assisting the vaporizing action. The fuel thus delivered to the vaporizer chamber is vaporized by the heat from the exhaust gases, under conditions referred to hereinbelow.

Leading from the vaporizer chamber is a vapor feed line 84 in which is a control valve 86 which includes the second throttle 42 identified above. Continuing from this valve 86 is a feed line 88 which leads to the outlet of the carburetor, indicated at 90 as communicating with the outlet line 36 forming a standard element of the carburetor. The vapor from the vaporizer chamber flows through the feed lines 84, 88 and to the line 36, and then to the engine, in a manner referred to again hereinbelow.

In the normal operation, a certain portion of the fuel, i.e., the excess fuel, or that not needed for immediate use, in the vaporizer chamber, condenses and forms a liquid body 92 in the well 56. The temperature at which this condensation takes place may vary according to different factors, including pressure. A second, liquid fuel return line 94 leads from the well to the fuel line 26 at the intake of the fuel pump. The return of this liquid fuel from the vaporizer chamber is controlled by a needle valve 96 which in turn is controlled by a float 98 pivoted at 100 in the chamber. Upon the level of this liquid body 92 rising to a predetermined level, the needle valve opens and the liquid fuel returns to the inlet of the fuel pump, by means of pressure developed in the vaporizer chamber, and in certain circumstances, by means of gravity.

The pressure in the vaporizer chamber, referred to above, is developed by the delivery of the fuel into the chamber, but a small portion is also provided by a funnel or scoop 102 connected with a line 104 leading to the vaporizer chamber, and particularly at a point therein adjacent the bottom of the well 56, and in the body 92 of the liquid fuel. The funnel 102 is mounted in position as indicated in FIG. 3 where it scoops a portion of the air stream produced by the fan 16. Preferably a screen 106 is placed over the inlet of the funnel. This pressure thus developed in the vaporizer chamber, from the fan, is in proportion to the speed of the cooling fan 16, and thus in proportion to the speed of the engine. This pressure may be as low as ½ lb. psi, and it may rise to in the neighborhood of 6–8 lbs. psi. This arrangement results in the introduction of a certain amount of air into the vaporizer fuel, but this air, from the fan, is only a small portion of the air utilized in forming the combustible mixture, being on the order of 1%–2% thereof. The remaining air is provided through the carburetor, under the usual control of the carburetor.

The valve 34 is controlled by a thermostatic unit 108 which is mounted on the exhaust pipe 18, and includes a heat sensing element 110 extending into the interior of the exhaust pipe for sensing the temperature of the exhaust gases. The unit 108 is provided with a link or element 112 leading to the valve 34 for actuating the latter. When the exhaust pipe is cool, the unit 108 acts to shift the valve 34 to a first position for directing fuel from the line 28 to the line 30 and thereby to the carburetor. In this condition the engine operates as if the device of the present device is not applied thereto. When the exhaust gases reach a predetermined temperature, the unit 108 serves to shift the valve 34 toward and to a second, and opposite, position, directing the fuel from the line 28 through the line 72 and to the vaporizer chamber.

In the operation of the apparatus, and assuming first a cold condition, when the engine is started, the valve 34 directs the fuel to the carburetor, and it is there atomized and delivered to the engine in the usual manner. In this stage of operation there is no vaporized fuel developed. The engine is under the control of the accelerator pedal 44 which actuates the throttle 42 of the carburetor in the usual manner, allowing less, or more, fuel to the engine. Actuation of the accelerator pedal also controls the second throttle 46, at the same time, but at this stage, no fuel has been vaporized and the fuel lines 84, 88 are empty.

As the engine warms up consequent to running, and the exhaust gases heat up, these exhaust gases, in passing through the coil 60, heat up the coil, and thus the interior of the chamber. Simultaneously therewith, pursuant to the heating up of the exhaust gases, the thermostatic unit 108 functions to switch the valve 34, toward its second position, whereby the fuel is directed from the fuel line 28 through the line 72 and to the vaporizer chamber. The valve 34 is preferably of gradually closing/opening character, so that as it moves from its first position in which it directs fuel to the carburetor, to its second position in which it directs fuel to the vaporizer chamber, it does so slowly. As a consequence the fuel to the carburetor is gradually reduced and the fuel to the vaporizer chamber is gradually increased. Thus the engine starts on the atomized fuel, and continues on both the atomized fuel and vaporized fuel in a gradual transition step, that is, at the first portion of that step, the fuel is entirely atomized, and that fuel gradually lessens and the vaporized fuel gradually increases, so that there is a mixture of the two conditions or phases of the fuel between the extremes until all of the atomized fuel is shut off, and only the vaporized fuel flows to the engine. All through this phase, both throttles 42, 46 are actuated in unison as mentioned above, and even though they both are so actuated, the fuel that is delivered to the engine is controlled by the one that is in the stream of fuel. While the valve 34 moves toward its second position and shuts off fuel to the carburetor, the throttle 42 remains open, according to the actuation of the accelerator pedal 44 so that the throttle 42 permits sufficient air for producing proper combustible mixture with the vaporized fuel from the line 88. Although the fuel to the carburetor is shut off, and the carburetor does not function in controlling the flow of fuel, it does however remain operative in controlling the flow of air for mixture with the vaporized fuel.

It is also within the scope of the invention to vaporize the fuel from the heat of the engine coolant, instead of from the exhaust gases. Such an arrangement is shown in FIG. 5, which includes the engine 12, radiator 14, fan 16 and the vaporizer chamber 10. This arrangement includes a tube 114 for carrying the coolant from the engine to the radiator, and a return line 116. The hot coolant from the line 114 also is carried by a line 118 to the inlet extension 62 of the vaporizer chamber and a line 120 from the outlet extension 64 to the cool return line 116.

Furthermore, the invention is sufficiently broad to cover any kind of external heater, including an electric heater element. FIG. 6 shows such an electric heater 122 in the vaporizer chamber 10, connected with conductors 124 leading from a suitable source such as the battery 126 in the automobile.

Accordingly, the operator performs the operating steps, for driving the engine, in exactly the same manner as he would without the apparatus of the present invention applied thereto. In other words he actuates the accelerator pedal 44, and the fuel delivered to the engine is of atomized form, or vaporized form, according to the condition of the engine itself, that is, the temperature thereof, and there is no requirement for a special manipulation required because of the change of fuel.

In order to apply the apparatus of the invention to an ordinary engine, there is an absolute minimum of adaptation required. The apparatus is simply applied to the engine, and the engine and related components are not in any way affected from the standpoint of constructional features. The coil terminal extensions 62, 64 do however extend through the holes in the exhaust pipe, as does the thermostatic unit 108, but these holes are minimal, and it is also within the scope of the invention to provide a fitting containing these elements that may be simply interposed as a section in the exhaust pipe.

The temperature at which the switch-over from atomized fuel to vaporized fuel may be as desired, such for example as between 110° F. and 160° F. in the vaporizer chamber. This temperature is determined of course by pre-selecting elements of the desired characteristics.

Tests have proved that standard automobiles now on the road, provided with the device of the invention, have obtained greatly improved mileage.

The apparatus is relatively small, and can be easily accommodated under the hood of most automobiles. In the case where space is at a premium, the apparatus may be re-designed to the particular space available. As an example of the approximate size of the apparatus, the vaporizer chamber 10 may be on the order of 7" in diameter, and the main housing 5" deep, in axial direction. The well 56 may be for example 2" in axial direction. Obviously these dimensions are not considered limiting, but merely as examples. The vaporizer chamber constitutes the largest component of the apparatus, and from that, and the relative sizes of the other components, can be visualized that a very small space is required for the entire apparatus.

I claim:

1. Apparatus for retrofitting to a self contained automotive vehicle including the following components in its original construction—an engine, a carburetor for controlling the flow of liquid fuel to the engine and including a throttle, an inlet fuel line from a supply to the carburetor and an outlet fuel line from the carburetor to the engine, a manual control for controlling the carburetor throttle, a heat system including a circuit having a liquid coolant for cooling the engine, and an exhaust pipe leading from the engine, said apparatus comprising the following components mounted in and attached to the vehicle and removable therefrom substantially without altering the physical construction or operability of the engine according to its original design and construction, a vaporizer chamber including a generally enclosed housing, a tubing coil in the housing having inlet and outlet terminals extending through the housing and into the heat system for impelling a stream of heated fluid through the coil, a vaporizer fuel line leading from the fuel supply to the vaporizer chamber, A vapor feed line leading from the vaporizer chamber to the outlet line from the carburetor, a second throttle in the vapor feed line, means interconnecting the throttles and operable, in response to actuation of said manual control, for operating said second throttle simultaneously with the carburetor throttle and in the same opening/closing sense, and a feed valve for controlling the flow of fuel from the supply to the carburetor and the vaporizer tank selectively.

2. Apparatus according to claim 1 wherein,
the tubing coil is operably connected with the exhaust pipe and thereby operable for impelling heated exhaust gases through the coil.

3. Apparatus according to claim 1, wherein,
the tubing coil is operably connected with the liquid coolant circuit and thereby operable for impelling liquid coolant through the coil.

4. Apparatus according to claim 1 wherein,
the fuel valve has a normal position directing flow of fuel to the carburetor and shutting it off from the vaporizer tank, and
the apparatus includes valve control means operable in response to increase of heat in the heat system for moving the fuel valve from its normal position to a second position in which the valve directs fuel to the vaporizer chamber.

5. Apparatus according to claim 4 wherein,
the valve control means is operable for so moving the fuel valve gradually, and thereby operative for gradually increasing the flow of fuel to the vaporizer chamber and gradually decreasing the flow of fuel to the carburetor.

6. Apparatus according to claim 5 wherein,
the fuel valve is operative when moved fully to and in its second position for shutting off the fuel to the carburetor.

7. Apparatus according to claim 4 wherein,
the valve control means includes a sensing element in the exhaust pipe and thereby is responsive to the heat of the exhaust gases for performing its function in controlling the fuel valve.

* * * * *